United States Patent [19]
Turner et al.

[11] 3,910,610
[45] Oct. 7, 1975

[54] LEAK CLAMP FOR BELL AND SPIGOT PIPE JOINT

[75] Inventors: Frank E. Turner, San Mateo; David Andries, Pacific, both of Calif.

[73] Assignee: Rockwell International Corporation, Pittsburgh, Pa.

[22] Filed: Jan. 26, 1973

[21] Appl. No.: 326,879

[52] U.S. Cl................ 285/337; 24/73 PF; 285/24; 285/413
[51] Int. Cl.²......................................... F16L 21/06
[58] Field of Search ............ 285/337, 413, 368, 24, 285/27; 277/101, 11

[56] References Cited
UNITED STATES PATENTS

| | | | |
|---|---|---|---|
| 696,603 | 4/1902 | Smith............................. | 285/337 X |
| 742,352 | 10/1903 | Price.................................. | 285/337 |
| 1,951,034 | 3/1934 | Norton............................... | 285/413 |
| 3,288,495 | 11/1966 | Newell et al..................... | 285/337 X |
| 3,415,547 | 12/1968 | Yano ................................ | 285/337 |
| 3,469,852 | 9/1969 | Smith et al...................... | 285/413 X |
| 3,547,471 | 12/1970 | Dunmire........................... | 285/337 |
| 3,700,270 | 10/1972 | Howard ............................. | 285/337 |
| 3,720,428 | 3/1973 | Zastawny........................... | 285/368 |

FOREIGN PATENTS OR APPLICATIONS

| | | | |
|---|---|---|---|
| 14,374 | 6/1909 | United Kingdom.................. | 285/24 |
| 14,695 | 7/1905 | United Kingdom................. | 285/337 |

*Primary Examiner*—Thomas F. Callaghan

[57] ABSTRACT

A leak clamp for preventing leakage from the annular joint formed at the connection of bell and spigot pipes comprising identical arcuate members coupled together to form a bell ring adapted to fit around and bear against the shoulder of a bell pipe and a spigot ring adapted to fit around a spigot pipe against a circular gasket adjacent the end of the bell pipe and bolt means for drawing the bell and spigot rings together axially and against the gasket. Each arcuate member has male and female coupler portions at opposite ends which connect them together in circular alignment. Clip-on centering members are provided for use on the spigot ring to position it properly for engaging the gasket.

5 Claims, 11 Drawing Figures

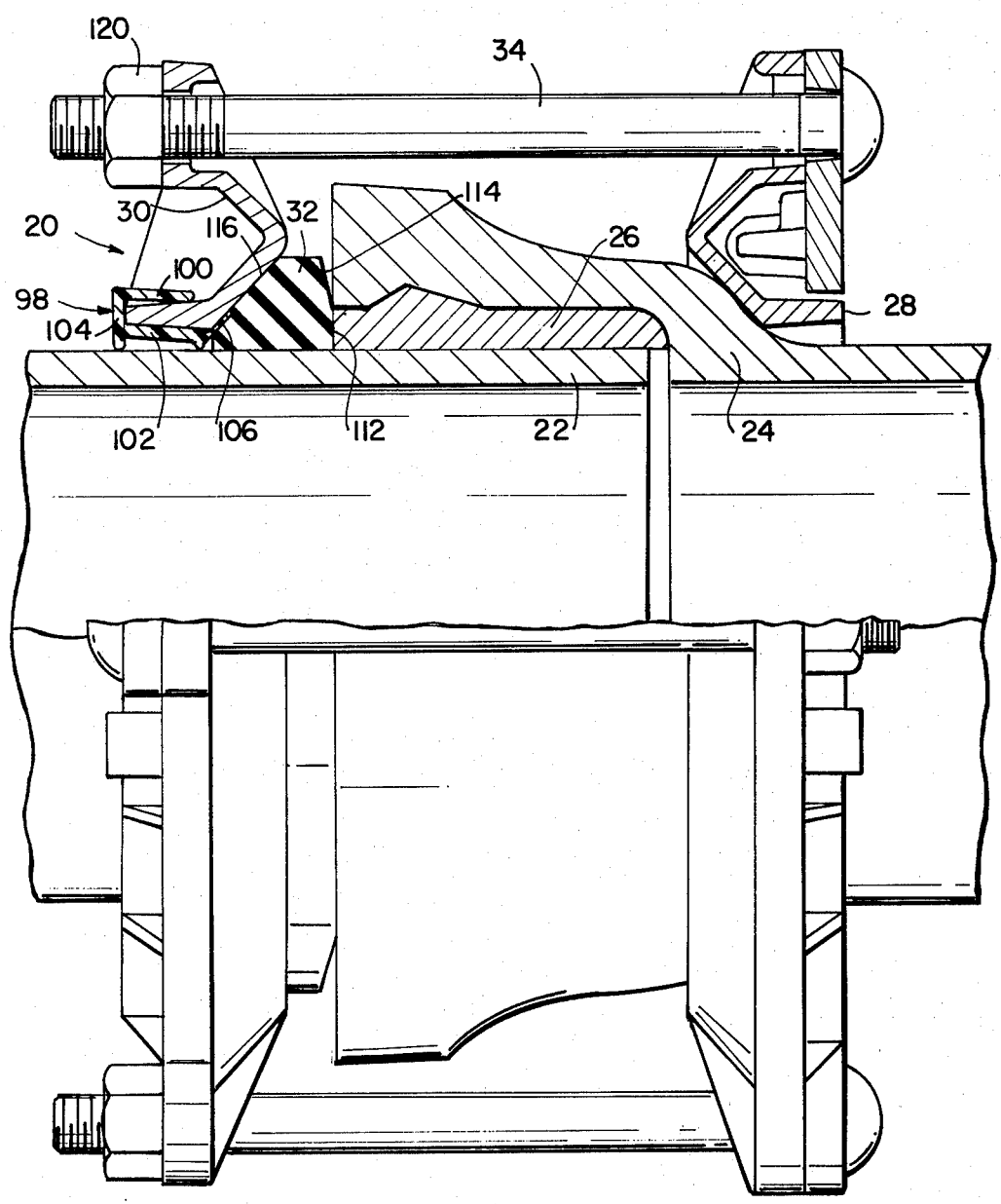
FIG_1
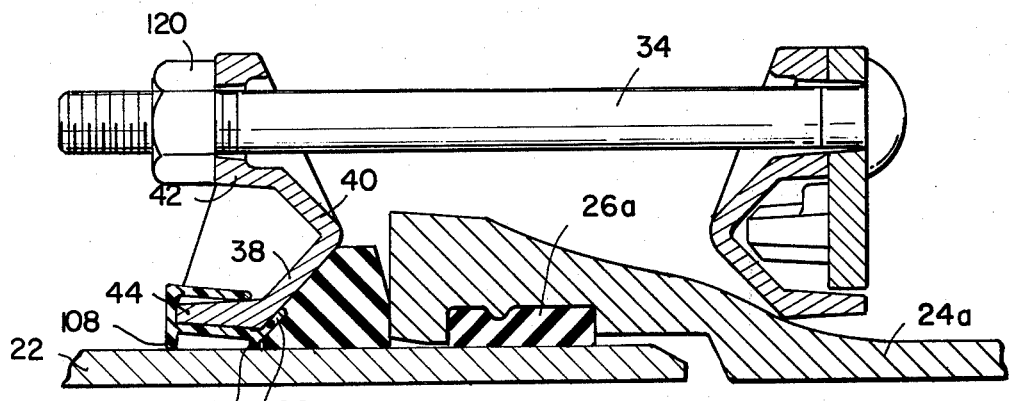
FIG_2

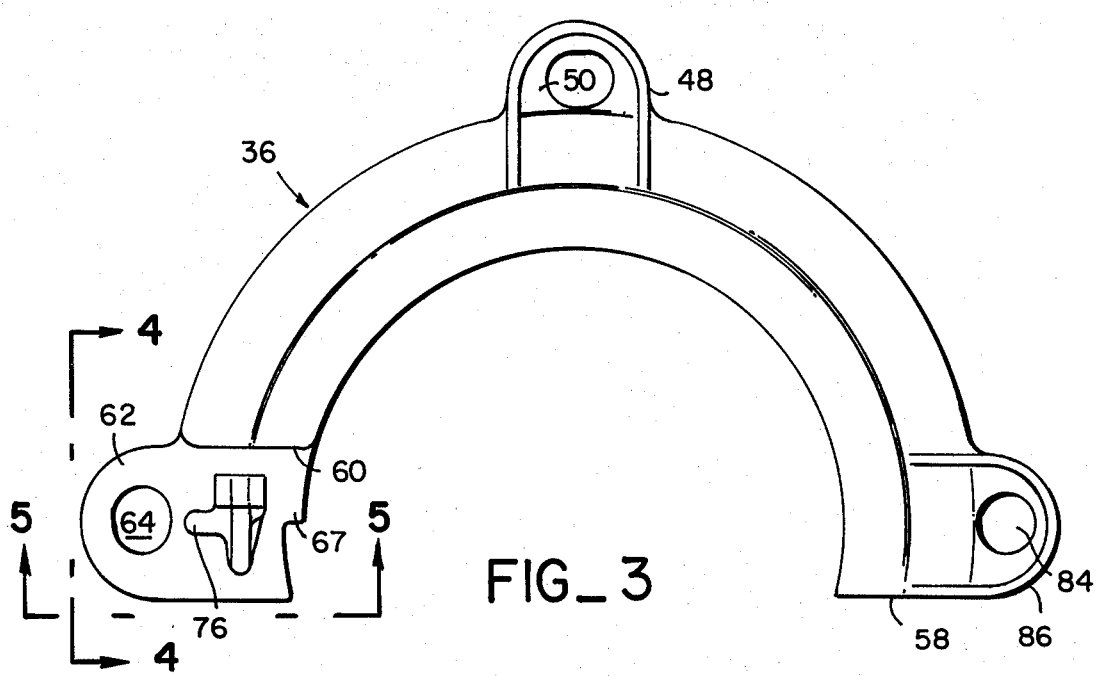
FIG_3
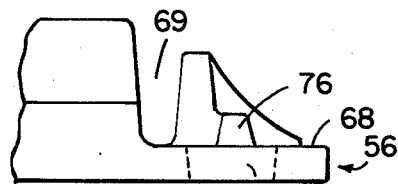
FIG_4
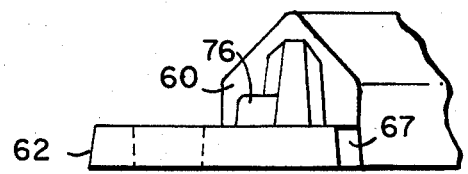
FIG_5
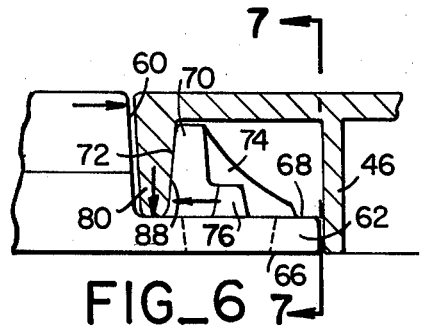
FIG_6
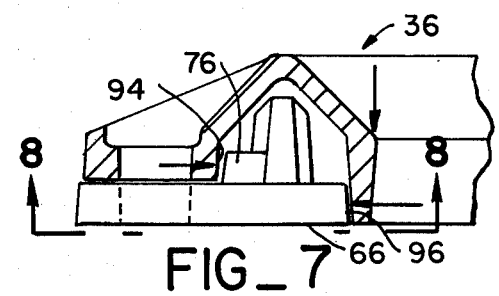
FIG_7
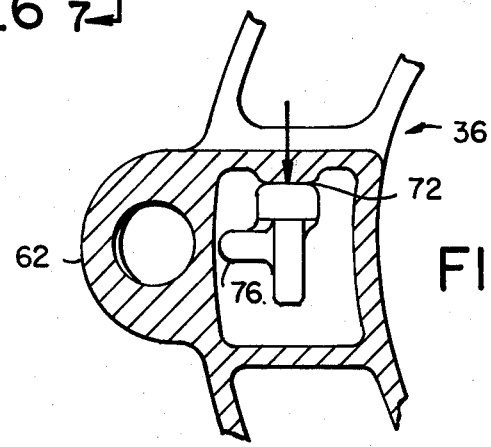
FIG_8

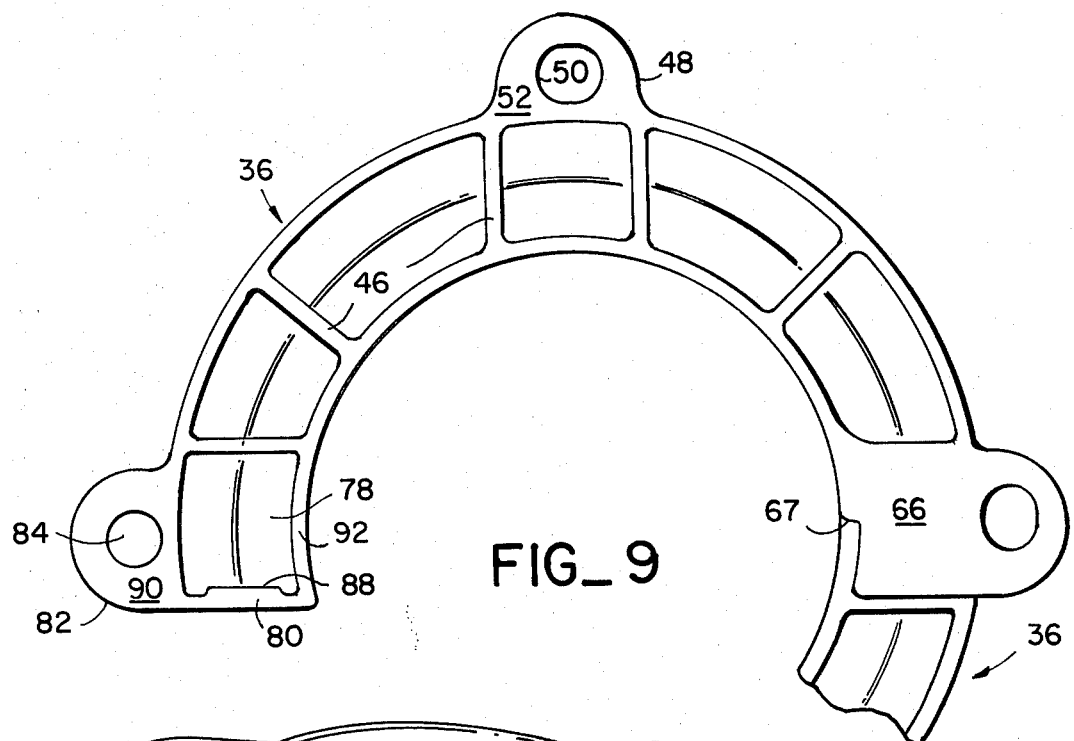
FIG_9
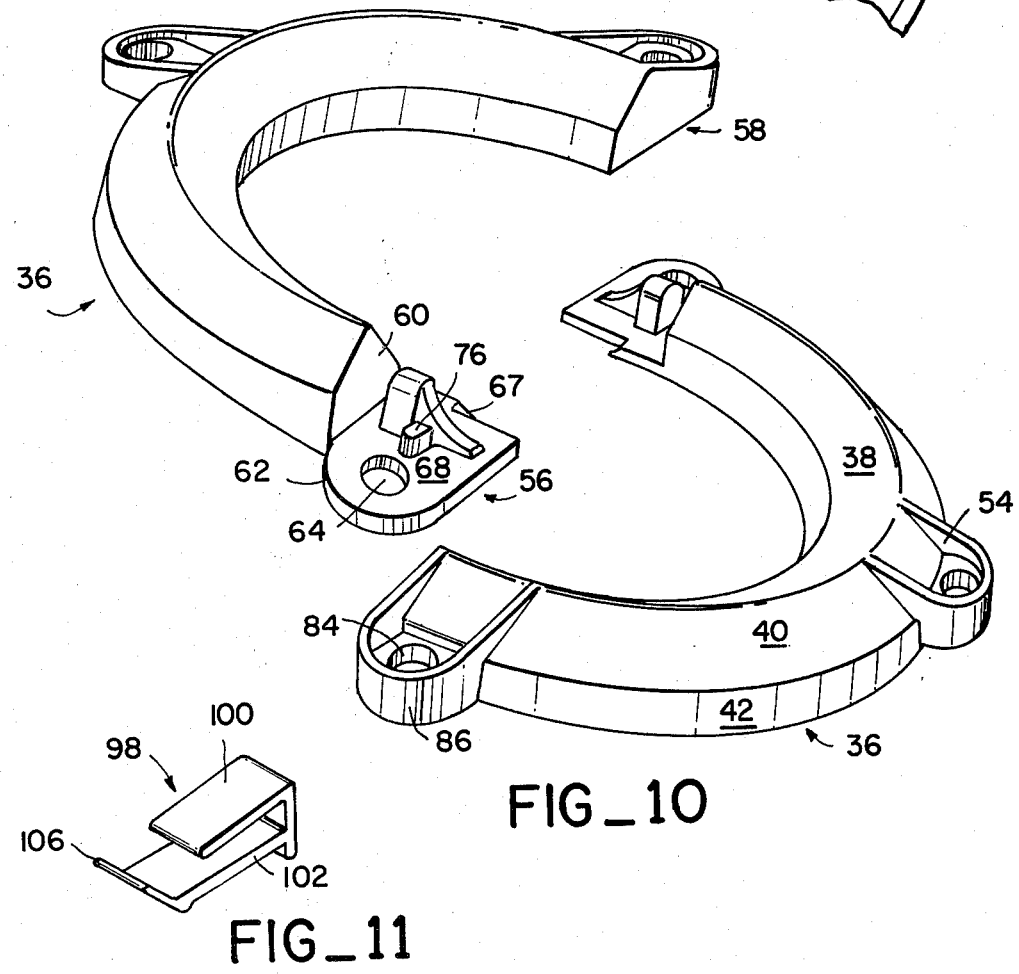
FIG_10
FIG_11

LEAK CLAMP FOR BELL AND SPIGOT PIPE JOINT

FIELD OF THE INVENTION

This invention relates to an improved leak clamp for use on bell and spigot pipe joints.

BACKGROUND OF THE INVENTION

Bell and spigot pipe joints are formed in a variety of ways and with a wide range of pipe configurations and sizes. For example, on many such joints lead or some other caulking compound is poured into the joint to provide a seal. Another widely used pipe joints utilize a rubber gasket generally seated within a groove of either the bell or spigot pipe. Eventually, and usually after extended service, the pipe joint may commence to leak due to failure of either the caulking compound or gasket, and a suitable leak clamp must be installed to stop the leak. Although many such clamps for bell and spigot pipe joints have been developed heretofore, each was relatively limited to the range of pipe sizes and shapes on which it could be used satisfactorily. Bell and spigot pipes have long been used extensively for gas stream, water, waste and other conduit systems which utilized a wide variety of pipe types, shapes and sizes. Hence, it was necessary for a repair agency having responsibility for maintaining conduit systems in a large area having such varied forms and sizes of pipes to stock a similarly large number of clamp types and sizes. The present invention, to a large degree, solves this problem.

SUMMARY OF THE INVENTION

In general, a clamp embodying the present invention is comprised of a bell ring and a spigot ring which are mounted on the bell and spigot pipe ends respectively and drawn toward each other by axially extending bolts. The spigot ring extends around the spigot pipe end and bears against a circular gasket positioned bell the ball end of the adjoining pipe. Both the bell and spigot rings are comprised of two or more semi-circular or arcuate members that interlock together at their ends and all of which are identical in size and shape. At the opposite ends of each semi-circular or arcuate member are male and female portions of a connector that interlocks them together to form a ring without the need for any fastener. The assembled ring members are shaped so that they will bear against and retain themselves in position on bell and spigot pipe having practically all the known variations of bell shapes. They are also shaped so that when used as the spigot ring they will readily retain a series of centering guide hooks that may be used during assembly of the clamp to position the spigot ring properly on the spigot pipe end particularly with respect to the gasket. Further, the ring members are shaped with a stable cross section which minimizes warpage that normally might occur in the casting and annealing process on lightweight segments. This is important since it assures a proper mating of cast ring pairs during assembly of a clamp.

It is therefore one object of the present invention to provide an improved bell joint leak clamp.

Another object of the present invention is to provide a bell joint leak clamp that is comprised of relatively few components including a single casting useable in groups of two or more to form a bell ring and a spigot ring.

Another object of the present invention is to provide a bell joint leak clamp that can be easily installed on and will effectively seal the joint for pipes of different types having a wide range of shapes and sizes.

Another object of the present invention is to provide a half ring or arcuate member for a bell joint leak clamp having a configuration with male and female couplers at its ends such that when connected together in a pair they will act as a continuous circular ring and resist any buckling tendencies and casting segment separation.

Another object of the present invention is to provide a bell joint leak clamp comprised of two or more identical semi-ring members having a configuration that enables them to be cast from metal with a minimum amount of warpage, thereby assuring its couplers of making firm connections to form either a bell ring or a spigot ring.

Other objects, advantages and features of our invention will become apparent from the following detailed description of one preferred embodiment.

DESCRIPTION OF THE DRAWINGS

FIG. 1 is a view in side elevation and partially in section of a leak clamp according to the present invention installed on a typical bell and spigot pipe joint;

FIG. 2 is a fragmentary view similar to FIG. 1 showing our clamp installed on a different type of bell and spigot pipe joint;

FIG. 3 is a front plan view of one half ring member of a bell joint leak clamp according to the present invention;

FIG. 4 is a view taken at 4—4 on FIG. 3;

FIG. 5 is a view taken at 5—5 of FIG. 3;

FIG. 6 is a fragmentary view of one end of a clamp segment similar to FIG. 4 showing the end of the mating clamp segment in section;

FIG. 7 is a fragmentary view taken along line 7—7 of FIG. 6;

FIG. 8 is a fragmentary view taken along line 8—8 of FIG. 7;

FIG. 9 is a rear plan of one half ring member of our clamp;

FIG. 10 is an exploded view in perspective showing two half ring members; and

FIG. 11 is a view in perspective of a centering member for our clamp.

DETAILED DESCRIPTION OF EMBODIMENT

FIG. 1 shows a leak clamp 20 embodying the principles of the present invention as it appears when installed on a typical bell and spigot pipe joint. In this joint the spigot end 22 of one pipe fits within the bell 24 and the adjoining pipe and is secured by lead 26 or some other caulking compound. In FIG. 2 another form of bell and spigot joint is shown with a bell 24a having a different shape and utilizing a rubber gasket or packing 26a. The two forms of bell and spigot joints shown are illustrative of the wide range of different bell shapes and sizes with such joints, substantially all of which can be accommodated by the clamp 20.

In general form, as with prior bell and spigot leak clamps, the clamp 20 is comprised of a first section or bell ring 28 that is adapted to extend around and bear against the bell portion 24 of one pipe, a second section or spigot ring 30 that is adapted to extend around the spigot pipe end and bear axially against a circular sealing gasket 32, and a series of bolts 34 for drawing the bell and spigot rings together.

In accordance with an important feature of the present invention both bell and spigot rings are comprised of two or more identical members which connect together at their opposite ends. In the drawings, the bell and spigot rings shown are both comprised of two semicircular or half ring members or segments 36, and thus four of these members or segments are required for the clamp 20. However, for clamps of larger size it may be desirable to form each bell and spigot ring from three or more arcuate segments instead of merely two semicircular or half ring members. In any case, according to our invention, all of the ring segments or members are identical in size and shape and are therefore interchangeable and can be cast from the same mould from some suitable material such as malleable or ductile iron. FIG. 3 shows a half-ring member or segment 36 from its front side and FIG. 9 shows one from its rear side. In cross section (see FIGS. 1 and 2) each ring segment has generally a V-shaped configuration formed by conical inner and outer portions 38 and 40 that merge together along an annular vertex. Extending axially from the outer conical portion is a generally cylindrical outer flange portion 42 and extending axially from the inner conical portion is a similar flange portion 44 that is preferably slightly longer. As shown in FIG. 9, integral web-like portions 46 extend radially between the inner and outer conical and flange portions at spaced apart intervals along each half ring member. Centrally located between the ends of each segment 36 is an intermediate ear member 48 having an oval shaped opening 50 for receiving one bolt 34. This ear member extends radially outwardly from the outer flange portion of the half ring member and its rear face 52 is flush with the edge of this outer flange portion. Side portions 54 of the ear member extend from its top and connect with the outer conical portion 40.

At the opposite ends of each ring segment 36 are male and female couplers 56 and 58 which enable these members to be connected together in pairs to form the circular ring and spigot sections of the clamp 20. As shown in FIGS. 4 and 5, a transverse web or end wall 60 is provided between the inner and outer conical portions and their flange portions, and the male coupler comprises an ear member 62 of substantially uniform thickness that extends from this end wall at one end of the ring segment. This ear member has an oval shaped bolt opening 64 in a portion that projects radially outwardly from the outer flange portion, and its rear face 66 is flush with the outer and inner flange portions 42 and 44 at this point in a plane that extends generally perpendicular to the central axis of the clamp. On the inner edge of the ear member 62 is a notched out portion forming a shoulder 67 which lies substantially in a plane that extends through the center of the opening 64. Projecting upwardly from the upper face 68 of the ear member 62 is a key-like lug 70 that is spaced from the end wall 60 by a predetermined distance. This lug has a radially extending face 72 that slopes slightly upwardly from the upper face and away from the end wall 60, thereby forming a slightly tapered notch 69 between them. Supporting the lug 70 is a sloping web portion 74 on its rear side that extends from the top of the lug to the surface or face 68. Projecting radially outwardly from the side of this latter web portion, as shown in FIG. 5, is an integral positioning finger portion 76.

At the other end of each ring segment 36, as shown in FIG. 9, the female coupler comprises a pocket 78 formed by the merging inner and outer conical and flange portions, a transverse web portion 46 and a similarly transverse end wall 80. Radially extending from the outer flange portion forming this pocket is an ear member 82 having a bolt opening 84. Side portions 86 on the ear member extend radially inwardly from its outer end to the outer conical surface. Within the pocket 78 on the inner side of the outer end wall 80 is a projection with a surface 88 which is generally parallel with the wall itself. The ear 82 has a rear surface 90 that is in the same plane as the edge of the outer flange 42 and also in a plane coincident with the surface 68 of the male coupler. Approximately half way along the side of the pocket 78 the wider inner flange portion 44 forms an abrupt shoulder 92 which is normally engaged by the shoulder 67 of a mating male coupler.

When two ring members or segments 36 are connected together the male and female couplers of both interlock and force each other into a position that forms a perfect circular ring which can be readily held together by the bolts 34. As shown in FIGS. 6 – 8 and 10, the end wall 80 of the pocket 78 on the female coupler fits in the slot 69 between the end wall surface 60 and with the outer lug surface 72 bearing against the inner wall surface 88. This provides a means for positioning the two half ring members circumferentially. Simultaneously the radially extending lug portion 76 is positioned adjacent to the inner surface 94 of the outer flange portion within the pocket of the mating coupler while the inside edge 96 of the ear member 62 bears against the inner flange portion that forms a wall of the pocket (See FIG. 7). At this point the front face 68 of the ear member 62 is flush against the rear side 90 of the ear member 82 with the openings 64 and 84 of the two ear members aligned and the shoulder 67 of the male coupler bearing against the shoulder 92 of the female coupler, as shown in FIG. 9.

Attached to the inner flange portion of the bell ring section at circumferentially spaced apart intervals are a plurality of snap-on centering members 98. These members may be made from a suitable metal or a plastic material such as polyvinylchloride. As shown in FIG. 11, each centering member has upper and lower jaw portions 100 and 102 joined together at one end by a web portion 104 and spaced apart a distance roughly the same as the thickness of the inner flange portion 44 of the ring segment 36. The lower jaw portion is longer than the upper jaw portion and has an end portion 106 that slopes upwardly from it at an angle e.g. 45°) toward the plane of the upper jaw. At opposite ends of the lower jaw are inner and outer integral transverse ridge portions 108 and 110. The outer ridge portion which is essentially an extension of the web portion 104 is preferably somewhat longer than the inner ridge portion so that each centering member 98 will tend to slope slightly and have a wedging action when installed.

The gasket 32 of the clamp 20 is molded from elastomeric material with a uniform cross section. As shown in FIG. 1, the inner gasket surface is precisely cylindrical so that it will fit flush against the outer wall of the spigot pipe. The forward radial surface 112 that fits against the pipe joint has an inner portion in a plane that is perpendicular to the pipe axis and an outer portion 114 in a plane that angles away from the bell end of the pipe joint. A rear surface 116 of the gasket has a conical slope having the same angularity as the outer surface of the inner conical portion 38 of the clamp, so that it will bear flush against this gasket surface 116 and apply uniform axial force to it as the clamp is tightened. The gasket generally is formed as one elongated piece of fairly hard molded material (e.g. 75 durometer) having male and female coupler portions of a key-lock or dove-tail configuration at its ends that can mesh and enable the gasket to form its circular configurations. To accommodate pipes of different sizes requiring gaskets of different length a short section of any suitable size can be added between its end couplers in the manner when known to those skilled in the pipe clamp art. Other types of gasket could also be used with our clamp, if desired.

The installation of our clamp 20 can be accomplished quickly and efficiently to repair a leak in a bell and spigot pipe joint for a wide range of pipes types and sizes. First, the bell ring section 28 is assembled around the bell pipe 24 from a pair of half ring members 36 (or from three or more arcuate segments) with the inner conical portion 38 bearing against the sloping, divergent shoulder of the bell pipe. The gasket 32 is connected to its circular configuration and placed around the spigot pipe so that its forward radial surface 112 bears against the annular joint between the bell and spigot pipes. Now, two more half ring members (or identical shorter arcuate segments) are connected together to form the spigot ring section 30. Normally, the centering members 98 having been previously clipped to their inner flange portions 44 of these ring segments in order to hold the assembled spigot ring section at a proper uniform radial distance from the spigot pipe surface so that its inner conical portion 38 will evenly engage the rear sloping surface 116 of the gasket. For large sized pipe the centering members may not be used. The bolts 54 are now installed through the appropriate aligned openings in the ear members of the two ring segments and a nut 120 on each bolt is threaded in place. The bolts may be installed from either direction, which further adds to the ease of installation. As these units are tightened, the ring segments 36 are forced into even closer circular alignment by the respective lug portions of their mating couplers and consequently the gasket is forced against the annular pipe joint with uniform axial force. This accomplishes a highly effective sealing of all possible areas of leakage in the joint.

From the foregoing it should be apparent that the present invention provides an improved leak clamp comprised of relatively few interchangeable parts that can be readily manufactured by conventional casting methods, and also a clamp that can be easily and quickly installed to provide effective leak stoppage. When the arcuate ring segments are connected by their end couplers they function as continuous bell and spigot rings. Despite their identity in shape, the function of each ring is different in that the bell ring affords a firm anchorage for almost all bell shapes while the spigot ring serves to apply uniform axial force to the annular gasket.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A leak clamp for preventing leakage from the annular joint formed at the connection of bell and spigot pipes, said clamp comprising, a plurality of identical arcuate segments, each having male and female coupler means at opposite ends for connecting said segments together in a first series to form a bell ring adapted to fit around and bear against a shoulder portion of said bell pipe and in a second series to form a spigot ring adapted to fit around said spigot pipe forming said joint with said bell pipe, all of said segments in said first and second series being identical, said arcuate segments having substantially cylindrical inner and outer flange portions which terminate at one end in ear members and at the other end in transverse walls, and male couplers extending from said ear members spaced from said one end of said flange portions, bridging walls extending between said inner and outer flange portions, the other end of said inner and outer flange portions, said transverse walls and said bridging walls forming pockets opening toward male couplers on other segments into which pockets said male couplers are received, said transverse walls being snugly received between said male couplers and said one end of said flange portions, whereby said pockets and male couplers coact to couple said segments together;

a circular gasket retained by said second series of arcuate segments against the end of said bell pipe;

and bolt means extending through said bell and spigot rings for drawing them together and forcing said gasket into sealing position against said annular joint.

2. The leak clamp as described in claim 1 in which said bridging wall is comprised of a first inclined wall portion extending from said inner flange portion at an angle diverging radially outward of the axis of said rings in the direction axially away from said inner flange and a second inclined wall portion extending from said outer flange at an angle converging radially inward of the axis of said rings in the direction axially away from said outer flange, said inclined wall portions merging to form an apex intermediate of said inner and outer flange portions.

3. The leak clamp as described in claim 1 in which said bridging wall is comprised of a first inclined wall portion extending from said inner flange portion at an angle diverging radially outward of the axis of said rings in the direction axially away from said inner flange, said first inclined portion adapted to bear against said gasket to urge it radially inward against said pipe as said bell and spigot rings are drawn together.

4. The leak clamp as described in claim 1 in which said male coupler includes a radially extending finger portion for engaging an inside wall of said pocket and thereby helping to align a pair of connected segments.

5. The leak clamp as described in claim 1 including notched out portions along the inner edge of said ear members, said notched out portions forming shoulders which are engaged by similar shoulders of the opposite couplers when a pair of segments are connected.

* * * * *